United States Patent [19]

Renfroe

[11] Patent Number: 5,435,407
[45] Date of Patent: Jul. 25, 1995

[54] HYDROSTATIC MANUAL VEHICLE STEERING SYSTEM

[75] Inventor: David A. Renfroe, Fayetteville, Ark.

[73] Assignee: University of Arkansas, Little Rock, Ark.

[21] Appl. No.: 230,311

[22] Filed: Apr. 20, 1994

[51] Int. Cl.⁶ .............................................. B62D 3/14
[52] U.S. Cl. .................................... 180/79; 280/773
[58] Field of Search ............... 180/79, 132; 280/771, 280/773, 87.2; 74/479 R, 479 MM, 480 R

[56] References Cited

U.S. PATENT DOCUMENTS

| | | | |
|---|---|---|---|
| 1,610,580 | 12/1926 | Nicholson | 280/773 |
| 1,621,916 | 3/1927 | Williams et al. | 280/773 |
| 2,111,668 | 3/1938 | Latzen | 280/773 |
| 2,171,157 | 8/1939 | Mathews | 280/660 |
| 2,229,394 | 1/1941 | Stinne | 280/773 |
| 2,757,014 | 7/1956 | Schmitz | 280/773 |
| 3,063,731 | 11/1962 | Liverance | 280/773 |
| 3,482,398 | 12/1969 | Christensen | 60/52 |
| 4,006,664 | 2/1977 | Brown | 91/171 |
| 4,986,387 | 1/1991 | Thompson et al. | 180/212 |
| 5,090,512 | 2/1992 | Mullet et al. | 180/236 |
| 5,094,312 | 3/1992 | Hakel | 180/132 |

Primary Examiner—Margaret A. Focarino
Assistant Examiner—Victor E. Johnson
Attorney, Agent, or Firm—Robert R. Keegan

[57] ABSTRACT

There is disclosed a steering system for a wheeled vehicle, particularly one with independent suspension of the steerable wheels, which is characterized by the lack of any necessity for a direct physical linkage between steering control arms of the left and right wheels and by the use of separate, independent fluid pressure cylinder pairs connected by fluid pressure conduit for imparting motion to the respective steerable wheels. Coordination between the angular motion of the left and right steerable wheels is attained by a direct mechanical linkage between actuator members of the hydraulic cylinders remote from the wheel suspension which linkage can be arranged for non-linear relative motion which will result in desired coordinated but unequal motion of left and right steerable wheels. Such linkage between actuator members is operated directly or indirectly by the steering wheel, steering levers, or other device. Preferably the fluid pressure cylinders connected to steering control arms of the wheels extend substantially parallel to suspension arms of the wheel suspension, and fluid pressure lines to such cylinders are flexible hoses which permit wide angle motion of the independent wheel suspension. Each fluid pressure cylinder may include between its ports a by-pass conduit and a valve releases the constraint between the interconnected fluid pressure cylinders; this facilitates alignment of the vehicle wheels or other adjustments. Preferably the fluid pressure system is pressurized at over 100 p.s.i.

19 Claims, 5 Drawing Sheets

HYDROSTATIC MANUAL VEHICLE STEERING SYSTEM

BRIEF SUMMARY OF THE INVENTION

The present invention relates to steering systems for wheeled vehicles, particularly such vehicles with at least two steerable wheels under manual control of a driver and in which the steerable wheels are independently suspended from the vehicle body frame. More generally, the invention is applicable to steering systems for wheeled vehicles with at least two steerable wheels. By the present invention, the necessary forces for causing each of the steerable wheels to properly respond to the steering control provided by the driver is effectuated between the vehicle body and the Independently suspended steerable wheel by a flexible pressure hose connection and a fluid pressure cylinder mounted in parallel with a suspension arm. The coordination of the left wheel and right wheel motion is attained, not with a direct mechanical link between steering control arms for the wheels, but rather by a direct mechanical link between the control fluid pressure cylinders actuator elements remote from the otherwise independent fluid pressure cylinders for the left and right wheels. An advantage of the system of the invention is that it facilitates a very large angle of vertical travel for the Independent suspension arms which is desirable for off-road vehicles and virtually impossible to obtain in conventional steering systems. Another advantage is that the necessity for a conventional steering column is eliminated along with the safety hazard that such columns present for the driver in the event of a mishap.

BACKGROUND OF THE INVENTION

The present invention is in sharp contrast to the traditional wheeled vehicle steering system. The structure, adjustment, and alignment of the steering mechanism of a wheeled vehicle is a somewhat complicated matter involving various relationships of each steerable wheel axle to the vehicle body referred to as caster, camber, toe-in, Ackerman angle and the like. No attempt is made here to present a detailed discussion of all of these factors, except as they relate to the improvements of the present invention.

For many decades the steering system for automotive vehicles has utilized a front axle which does not rotate about a vertical axis when the vehicle is steered to the right or the left. Rather, each front wheel is provided with a stub axle which is rotatable about a vertically disposed king-pin. Accordingly, it is necessary to provide means by which the front wheels turn to the left or turn to the right together in a coordinated fashion. It was long ago determined that optimum steering was not achieved with strictly parallel motion of the front wheels because the outwardly turning wheel is closer to the vehicle turning center than the inwardly turning wheel and needs to rotate through a greater angle. This refinement and provision for steering control is referred to as the Ackerman angle provision.

A common and conventional wheeled vehicle steering system provides for the rotation of the steering column or steering shaft to be converted into linear motion of a link which imparts a rotating motion to the stub axle of the wheel through a steering control arm extending from the stub axle. The common means for providing coordinated motion of the two steerable wheels includes a track arm which also is fixed with respect to the stub axle on each wheel together with a track rod extending between the two track arms so that the two front wheels are constrained to move in a predetermined relationship either to the right or to the left. In most cases the linkage provided does not maintain the wheels parallel but rather provides a nonlinear turning relationship which takes into account the Ackerman angle provision.

Hydraulic systems have been incorporated in conjunction with wheeled vehicle steering systems and perhaps the most common form of such hydraulic system is a power assist for the steering shaft which retains the above discussed track rod and track arm arrangement for coordinating turning motion of the steerable wheels. As mentioned above, the present invention eliminates reliance upon a track rod or other direct mechanical linkage between the left and right steerable wheels by causing the turning motion of each wheel to be effected by its own independent hydraulic actuator having no operative connection back to the vehicle body other than that provided by hydraulic hoses.

Steering systems for wheeled vehicles have been proposed in prior patents which employ hydraulic cylinders, but any of the known steering systems employing hydraulic cylinders have been unable to provide positive coordination (i.e. not implemented with a servomotor) between left and right steered wheels through hydraulic cylinder motion alone without providing a direct mechanical connection between the left side and the right side wheel.

U.S. Pat. No. 5,094,312 to Hakel dated Mar. 10, 1992 (U.S. CL. 180/132) shows a vehicle steering system in which the left and right steering control arms for the front wheels are both operated by a single double-acting hydraulic piston with oppositely directed piston rods each coupled by a mechanical link to a respective steering control arm. This single piston arrangement is in effect a direct mechanical linkage from the left side wheel to the right side wheel and there are not two independent hydraulic cylinders for the respective left and right steerable wheels. U.S. Pat. No. 4,986,387 to Thompson et al., dated Jan. 2, 1991 (U.S. CL. 180/212) shows a steerable wheeled vehicle with a steerable wheel for which turning motion is provided by hydraulic cylinder and a rack and pinion, but since there is only one steerable wheel, it provides no teaching with respect to coordination of two steerable wheels relevant to the present invention.

U.S. Pat. No. 5,090,512 to Mullet et al., dated Feb. 25, 1992 (U.S. CL. 180/236), like the patent to Hakel, relies on a direct mechanical connection from the left side to the right side of the steering system including a rotatable shaft and cam pulleys operating a cable arrangement for wheel steering. U.S. Pat. No. 4,006,664 to Brown has hydraulic operated steering, but like the patent to Hakel has only a single cylinder for left and right wheels, the coordinated motion of which must be provided by a linkage connecting left and right wheels with the single cylinder provided for their operation.

In addition to providing the features and advantages described, above, it is an object of the present invention to provide a, wheeled vehicle steering system which achieves coordination between the steering motion of the left and right wheels by providing independently controlled hydraulic actuators, the motions of which are coordinated through the hydraulic systems thereof, thereby avoiding the necessity of direct mechanical linkage extending between the right side and left side wheels of the vehicle.

It is another object of the present invention to provide a pair of left side hydraulic cylinders and a pair of right side hydraulic cylinders for a steerable wheeled vehicle wherein one cylinder of each pair is positioned at a steerable wheel and the other cylinder of each pair is positioned in proximity to the steering wheel or other steering control device and coupled thereto, thereby eliminating the necessity for a conventional elongated steering column extending from the driver position to the lower front portion of the vehicle.

It is yet another object of the present invention to provide a steering system for a wheeled vehicle wherein steering motion of each of the steerable wheels is provided by a hydraulic actuator positioned near or at such wheel together with means remote from the steerable wheels for coordinating the motion of the hydraulic actuators and obviating the necessity for a direct mechanical linkage between the left steerable wheel and the right steerable wheel.

It is still another object of the present invention to provide a steering system for a wheeled vehicle with at least two independently suspended steerable wheels in which the steerable wheels are each provided with a hydraulic actuator for producing steering motion for the wheel, and such hydraulic actuator is mounted with respect to the independent suspension for the wheel to allow large-angle vertical motion of the wheel suspension with turning forces provided to the wheel through flexible hydraulic hose connections from the vehicle body to the suspension-mounted hydraulic actuators.

BRIEF DESCRIPTION OF DRAWINGS

In addition to the objects and advantages described above, other objects and advantages of the invention will be apparent from consideration of the following description in conjunction with the drawings in which.

DETAILED DESCRIPTION

Figure 1:
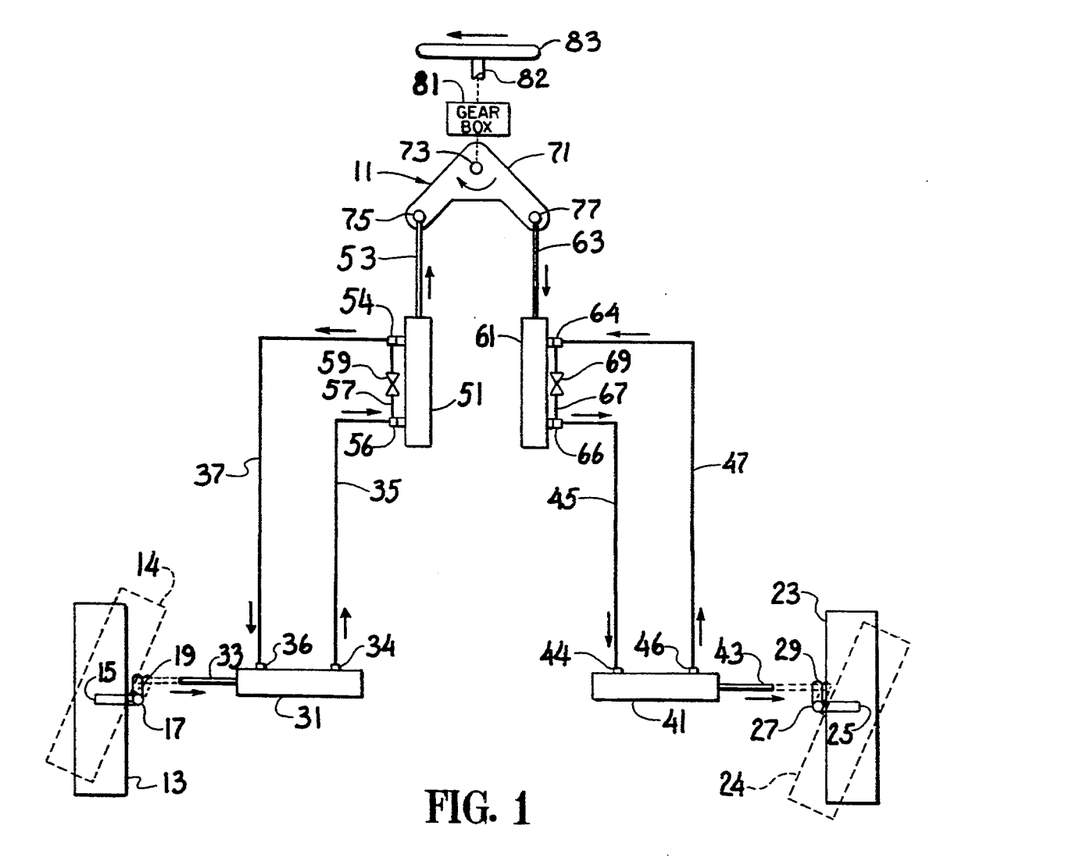
FIG. 1 is a schematic diagram of a hydraulic steering control system for a wheeled vehicle according to the invention.
Figure 2:
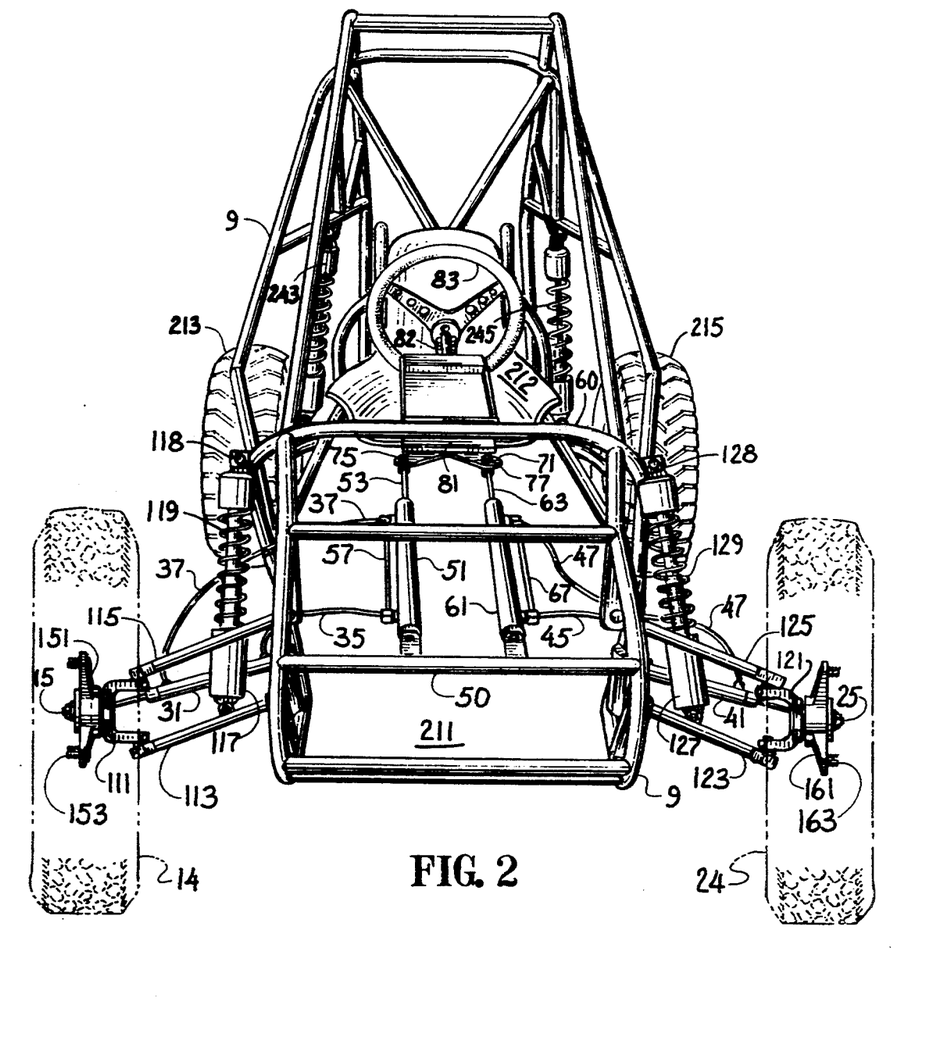
FIG. 2 is a perspective view of an off-road vehicle incorporating a hydraulic steering system according to the invention.

Referring now to the drawings in particular FIG. 1 and FIG. 2 a steering system 11 for a vehicle with a right front steerable wheel 13 and a left front steerable wheel 23 is shown wherein wheel 13 is mounted on a stub axle 15 and wheel 23 is mounted on a stub axle 25.

Wheels 13 and 23 with their stub axles 15 and 25 are mounted so that they are rotatable about a generally vertical axis to turn the vehicle to the left or to the right (as indicated by the dashed outlines 14 and 24).

Stub axle 15 has rigidly affixed thereto a steering control arm 19 and stub axle 25 has a similarly affixed steering control arm 29. Stub axle 15 and steering control arm 19 are pivotally mounted on a kingpin 17 which is secured in a generally vertical position on the outer end of the wheel suspension (not shown in FIG. 1). A similar symmetric arrangement is provided with respect to stub axle 25, steering control arm 29, and kingpin 27 for the vehicle left front wheel 23. As will later be described in more detail, a generally vertical axis of rotation for wheel 14 is provided by kingpin 17 throughout the substantial vertical travel of the wheel suspension relative to the vehicle body. Steering control arm 19 is mechanically coupled to a piston rod 33 of hydraulic cylinder 31 which serves to determine the angular position of wheel 13 to affect steering of the vehicle.

As will later be explained in greater detail, fluid pressure cylinder 31 is secured parallel to the wheel suspension for wheel 13 which at its upper end is pivotally secured to the vehicle body. It is understood that a single-ended double-acting hydraulic cylinder as schematically illustrated at 31 in FIG. 1 is a preferred simple, effective and readily available fluid pressure actuator for use in connection with the invention, but that numerous other forms of fluid pressure actuators having linear motion actuator elements or rotary motion actuator elements could be employed with the reservation that positive displacement (rather than servomotor) actuators are contemplated and preferred. Fluid pressure cylinder 31 has a fluid port 36 connected to a fluid pressure line 37 in the form of a flexible hose which is connected at its other end to a fluid port 54 of a fluid pressure cylinder 51 generally similar to fluid pressure cylinder 31.

Substantially identical symmetrically disposed elements are provided for left front wheel 23 in the form of fluid pressure cylinder 41 with actuator element or piston rod 43 and fluid pressure port 44 connected through fluid pressure line 45 to fluid pressure cylinder 61 at its port 66.

Fluid pressure cylinder 31 also has a port 36 connected through line 37 to port 54 of fluid pressure cylinder 51 and fluid pressure cylinder 41 has a port 46 connected through line 47 to port 64 of fluid pressure cylinder 61. Although it is theoretically possible to use pressurized gas to operate the fluid pressure cylinder arrangements shown In FIG. 1, it is contemplated and preferred that hydraulic cylinders and hydraulic liquid would be utilized; it is preferred that the hydraulic liquid of the systems be pressurized to a moderate degree, typically on the order of 100–200 p.s.i. Fluid pressure cylinder 51 has an actuator element or piston rod 53 and fluid pressure cylinder 61 has a similar actuator element or piston rod 63.

Observing the portion of FIG. 1 thus far described, it will be seen that the hydraulic coupling of cylinders 31 and 51 (in this example assumed to be substantially identical) will cause a motion of piston rod 53 causing it to extend and/or retract will cause an equal and opposite motion to piston rod 33 causing it to retract or extend. The same relation exists with respect to fluid pressure cylinders 41 and 61 wherein motion of piston rod 63 produces an equal and opposite motion of piston rod 43.

Piston rods 53 and 63 are coupled together by a rotatably mounted link and by respective connecting pins 75 and 77. In the illustrated example, the shaft 73 on which link 71 is mounted for rotation therewith and the ends of cylinders 51 and 61 remote from piston rods 53 and 63 are secured to the body frame of the vehicle and thus restrained against any relative translational motion. While it is important that the ends of fluid pressure cylinders 51 and 61 and shaft 73 be so restrained with respect to relative motion, it is not necessary that the body frame of the vehicle be used for such restraint. In other words, shaft 73 and fluid pressure cylinders 51 and 61 could be mounted on a rigid frame which was not rigidly secured to the body frame.

In addition to providing a mechanical coupling between piston rod 53 and piston rod 63, link 71 and shaft 73 are coupled through a gear box 81 to a steering shaft 82 and a steering wheel 83. In the example shown, gear box 81 serves a dual purpose of providing a 90° change in direction between shaft 82 and shaft 73 and a reduction of approximately 3 to 1 between the angular motion of steering wheel 83 and the angular motion imparted to link 71. Thus, if the steering wheel 83 is set for a lock to lock angle of plus or minus 135°. The total motion of link 71 would be plus or minus 45°, whereas a lesser lock to lock angle of plus or minus 45° for steering wheel 83 would result in a range of motion of plus, or minus 15° for link 71.

As best shown in FIG. 1, fluid pressure cylinder 51 is provided with a bypass fluid pressure line 57 between ports 54 and 56 in which is located a manual cut-off valve 59 which would normally be in the closed or off position. A similar bypass line 67 is provided for fluid pressure cylinder 61 together with manual cut-off valve 69 in line 67.

Since valves 59 and 69 are closed during normal operation, they and lines 57 and 67 have no affect upon the operation of the apparatus. However, the provision of valves 59 and 69 is very convenient for facilitating adjustment or alignment of the wheels and the steering system. When It is desired to align or realign the vehicle steering system valves 59 and 69 may be opened with the result that each of the wheels 13 and 23 as well as steering wheel 83 may be easily moved and positioned without affecting the other elements. Thus, with valves 59 and 69 opened, wheels 13 and 23 may be positioned manually or with the aid of a guide or jig to have the desired forward travel position with any needed toe-in or toe-out and at the same time steering wheel 83 may be freely rotated to its centered position at which time valves 59 and 69 may be closed to attain alignment of the system.

Arrows on the schematic diagram of FIG. 1 are placed to aid in explanation of the operation of the system as when the vehicle is being turned to the right as is indicated by the positions of wheels 13 and 23 indicated in dashed lines at 14 and 24. To produce such a wheel position, the wheel 83 would be turned to the driver's right (in the arrangement of FIG. 1 the driver's right is to the left of the sheet.) Right turning rotation of the wheel 83 causes clockwise rotation of link 71, extension motion of piston rod 53 and retraction motion of piston rod 63.

Motions of piston rods 53 and 63 in turn cause fluid flow as indicated by arrows on lines 35 and 37 and arrows on lines 45 and 47. Fluid flow as indicated in FIG. 1 causes retraction of piston rod, 33 and extension of piston rod 43, in turn causing clockwise rotation of stub axle 15 and clockwise rotation of stub axle 25. It should be noted that the arrangements and connection of the hydraulic actuators in the forms of cylinders 31, 41, 51, and 61 in FIG. 1 are subject to great variation and modification to achieve the function described above or its equivalent.

It should be noted from FIG. 1 and FIG. 2 that the motions applied to the cylinder piston rods 53 and 63 forming actuator elements for cylinders 51 and 61 by the rotation of link 71 are not equal and opposite. For such motions to be nearly equal and opposite the angular separation for connector pins 75 and 77 relative to the shaft 73 would be approximately 180°. With this angle being substantially less than 180° and typically between 135° and 180° the motion of the piston rod being extended beyond the mid-position is greater than the motion of the piston being retracted from the mid-position. According to the invention, this nonlinearity may be utilized to effect or contribute to the Ackerman angle provision in the motion of wheels 13 and 23. In some cases nonlinear motion of wheel 13 with respect to piston rod 33 and nonlinear motion of wheel 24 with respect to piston 43 may be sufficient to implement the desired Ackerman angle provision. In such a case, the link 71 could be arranged to provide substantially equal and opposite motion for piston rods 53 and 63. More commonly, the nonlinear affect of the linkage between piston rod 33 and 43 and wheel 13 and 23 respectively, combined with the nonlinear effect produced by the angular separation of pins 75 and 77 and the configuration of link 71 would be determined to attain the desired coordination (with or without Ackerman provision) between wheels 13 and 23. While the arrangement of link 71 has the advantage of simplicity, a much more complicated mechanical connection between steering wheel 83 and cylinders 51 and 61 could be utilized to obtain a more complex and exact relationship between the motions of piston rods 53 and 63 if desired.

The advantages of the steering system according to the invention are well suited to off-road vehicles, especially those utilized for sport and recreation, but steering systems according to the invention may be employed in a broad range of steerable vehicles. In other forms of vehicles, numerous modifications might be desired; for example, a substantially greater turning angle for the steering wheel from lock to lock might be desirable and the incorporation of a power-assist for shaft 73 or shaft 82 might be employed.

Figure 3:
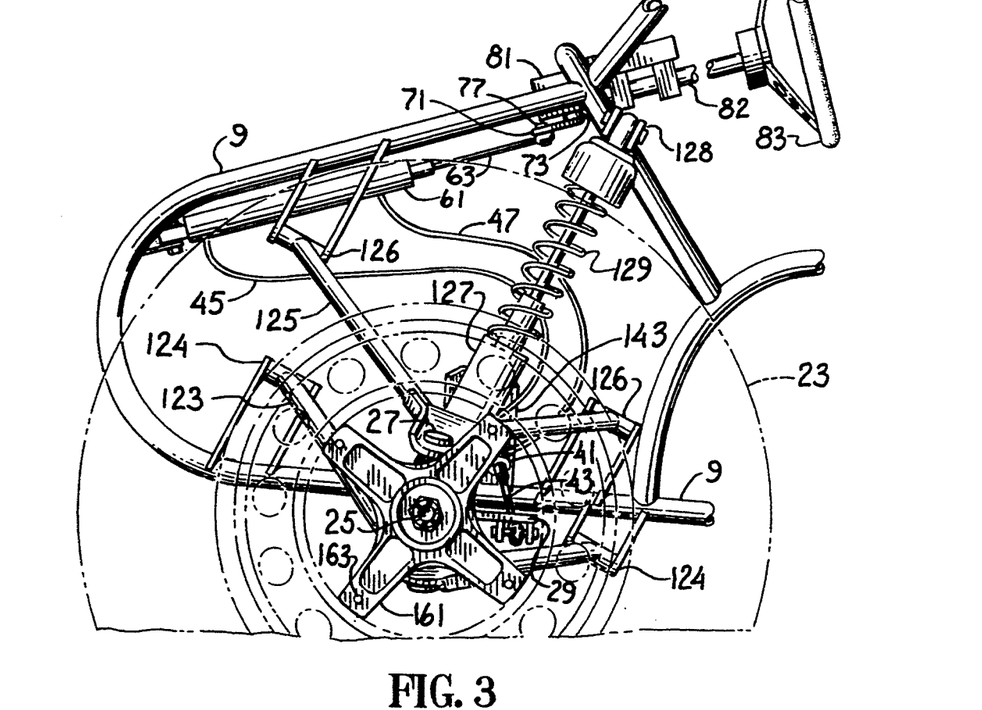
FIG. 3 is a fragmentary side elevational view of a front wheel portion of the vehicle of FIG. 2.
Figure 4:
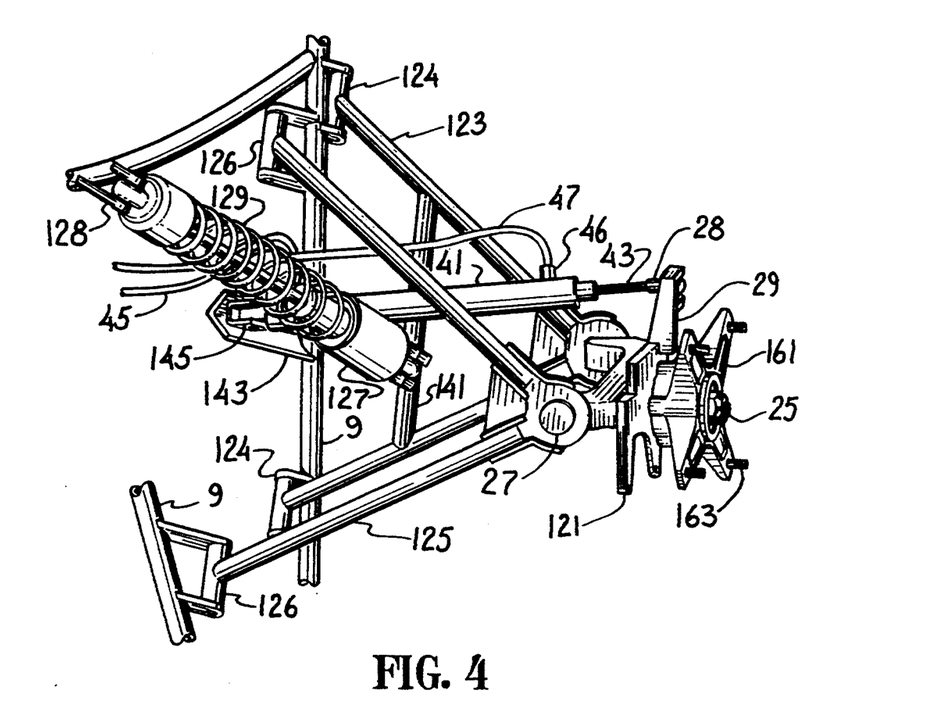
FIG. 4 is a fragmentary top plan view of the vehicle portion shown in FIG. 3.

The manner in which fluid pressure cylinders 31 and 41 may be mounted with respect to a vehicle independent suspension system may best be understood with reference to FIGS. 2, 3, and 4. Left front wheel independent suspension of vehicle body 9 details are shown in FIGS. 3 and 4. This suspension (and the right wheel suspension which is symmetrical thereto) is of the A-frame type including an upper A-frame member 125 and a lower A-frame member 123 which is provided with a cross-member 141. A-frame member 123 is pivotally mounted with respect to frame 9 at brackets 124 and A-frame member 125 is pivotally mounted to body frame 9 at brackets 126.

The axis of rotation defined by brackets 126 is generally parallel to the axis of rotation defined by brackets 124 and these axes are generally horizontal with a slight upward tilt at the forward end. This provides the suspension with a desirable attribute of permitting the front wheels to yield slightly in the rearward direction as well as in the upward direction upon receiving impact from an irregularity in the ground surface. While this feature of the suspension system would provide difficulties in the design of a conventional mechanical link steering system, the hydraulic steering system of the present invention can readily accommodate this type of suspension or any other form of independent wheel suspension.

The desired resilience and damping for the suspension system is provided by a generally conventional shock absorber 127 with coil-spring 129 mounted between cross-member 141 and bracket 128 on body frame 9.

Wheel 23 (not shown in FIG. 4) is secured on lug-bolts 163 on wheel 161 which is rotatably mounted on stub axle 25. For simplicity and clarity the conventional anti-friction bearings, brakes and similar elements provided for the vehicle are not shown. Stub axle base 121 is pivotally mounted relative to A-frame members 123 and 125 by king-pin 27. Also secured to stub axle base 121 is steering control arm 29.

Fluid pressure cylinder 41 has its piston rod actuator element 43 secured by a universal connection 28 to a point near the end of steering control arm 29 while the opposite end of cylinder 41 is connected by universal joint 145 to a bracket on the frame of body 9. SteerinS control arm 29 is vertically positioned about mid-way between the outer ends of A-frame members 123 and 125 and bracket 143 similarly positions the fixed end of cylinder 41 approximately mid-way vertically between the pivotal axis defined by brackets 124 and that defined by brackets 126. Thus, throughout the large angle motion of the independent suspension and A-frame members 123 and 125, cylinder 41 is maintained in a plane which is substantially parallel to the planes of A-frame member 123 and A-frame member 125. Therefore, in the absence of extension or retraction of piston rod 43, there is little or no turning motion imparted to steering control arm 29 and to stub axle 25 by any large angle excursion of A-frame members 123 and 125.

As previously described and as shown in FIG. 3, the extension and retraction motions of piston rod 43 positively track (111 the opposite direction) the motions of piston rods 63 of cylinder 61 by virtue of the pressure hydraulic hoses 47 and 45 connected between cylinder ports 44 and 46 of cylinder 41 and cylinder ports 64 and 66 of cylinder 61.

The preferred embodiment of FIGS. 1, 2, 3 and 4 thus far described, utilize fluid pressure cylinders such as 41 of conventional form, and for convenience they are all substantially identical whereby a predetermined motion of the piston rod actuation member of one cylinder produces an equal (but perhaps opposite) motion of a cylinder connected serially therewith. Obviously, conventional cylinders of different diameters could be used in a cylinder pair in which there would be different but linearly related motion of one cylinder actuation member with respect to the other cylinder actuation member. In fact, there are a great variety of fluid pressure actuators and particularly hydraulic actuators with linear motion, with rotary motion, or of other forms which could be utilized in modifications of steering apparatus according to the present invention. For example, a rotary hydraulic actuator could be employed and positioned at the outer end of A-frame members 123 and 125 to rotate stub axle 25 and stub axle base 121 with respect thereto. Furthermore, electromagnetic rotary or linear actuators might be considered equivalent to the hydraulic actuators disclosed as the preferred embodiment herein, but it is doubtful that advantages accruing from such other forms of actuators would be conducive to foregoing the simplicity and reliability of the hydraulic cylinder actuators illustrated and described above.

Figure 5:
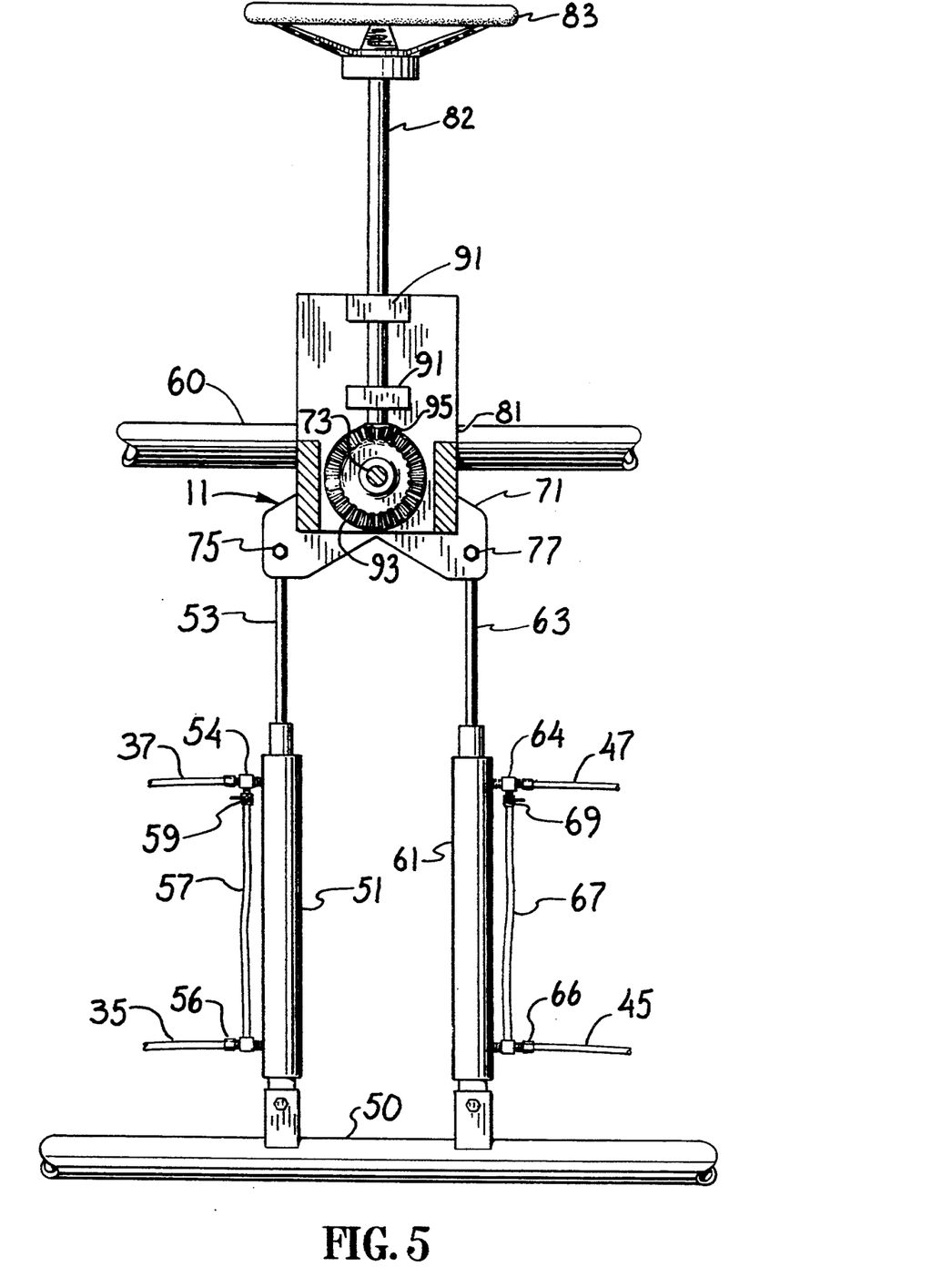
FIG. 5 is a fragmentary top plan view of the steering wheel and associated fluid pressure cylinders of the vehicle of FIG. 2.

FIG. 5 shows an exemplary form of gear box 81 in detail. Gear box 81 is rigidly secured to frame portion 60 of vehicle body 9 while cylinders 51 and 61 are pivotally secured at their base ends to frame portion 50 of vehicle body 9. Since frame portion 60 and frame portion 50 are rigidly connected by other portions of the frame of body 9 (not shown in FIG. 5), any rotational motion of link 71 is converted into translational motion of piston rods 53 and 63. So long as this rigid relationship of frame element 60 and frame element 50 is provided it is not necessarily required that Sear box 81 be permanently and rigidly affixed to the frame of vehicle body 9.

Steering wheel shaft 82 is mounted in bushing blocks 91 and a small miter Sear 95 is secured to rotate with shaft 82 and engage large miter Sear 93 on shaft 73. Therefore the miter box 81 acts to provide a change of direction of 90° and a gear reduction of about 3 to 1. Clearly the Sear box 81 could be replaced by any other conventional form of Sear box providing different changes of direction or no change of direction and providing whatever gear ratio might be appropriate to the particular steering system.

Components of the vehicle shown in FIG. 2 not described in connection with FIGS. 1 and 3–5 include the vehicle rear wheels 213 and 215 and the suspensions therefore partially shown at 243 and 245; the rear wheel suspension may be of any conventional form and since these wheels are not steerable the details thereof have not been shown and described. However, the steering system of the invention is also adaptable for four steerable wheels-vehicles and in such case rear wheels 213, 215 and suspension 243, 245 would be configured like those for the vehicle front wheels.

The vehicle may be provided with any desired form of driver seat 212 and with a foot rest 211. All other components such as electrical equipment, instruments, engine, transmission, and engine controls may be of conventional form and have been omitted for simplicity and clarity.

Figure 6:
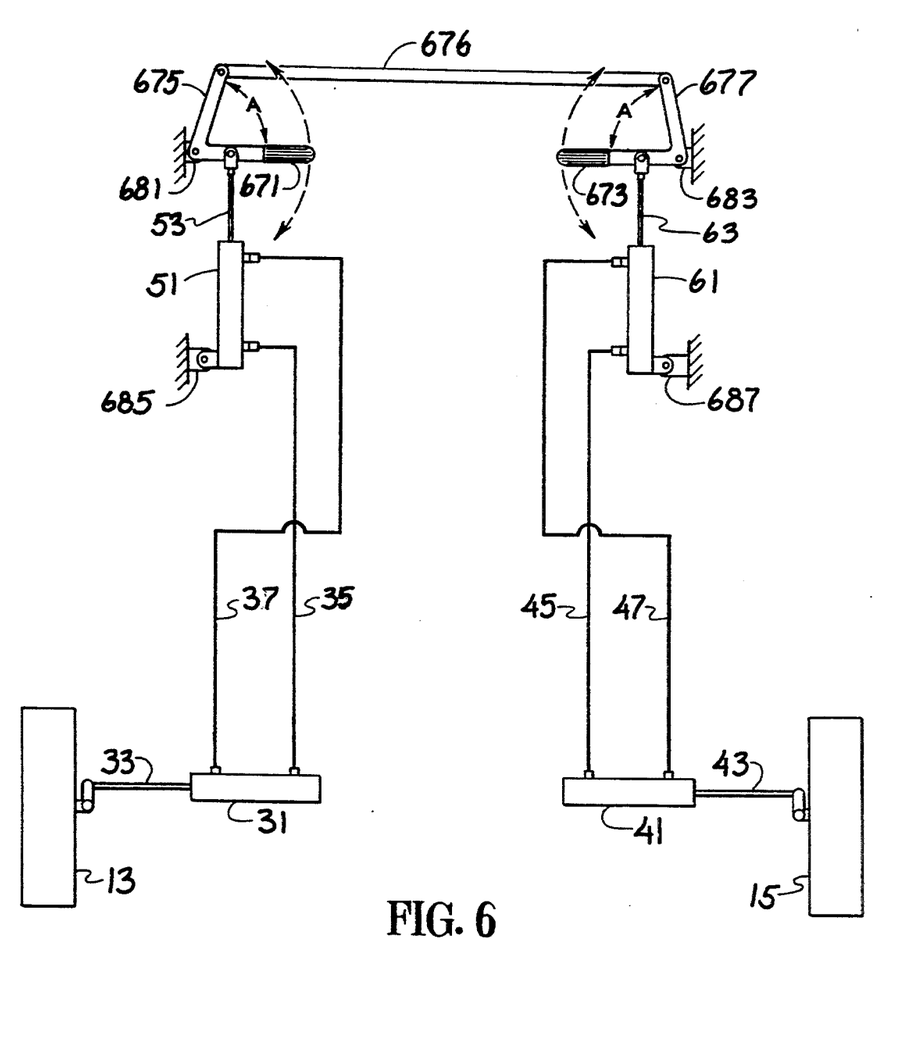
FIG. 6 is a schematic diagram of an alternative hydraulic steering control system differing from that of FIG. 1 in the use of steering levers rather than a steering wheel.

An alternative form of steering control is illustrated in FIG. 6 wherein steering wheel 83 and gear box 81 have been replaced by steering levers 671 and 673 pivotally mounted to the vehicle body by brackets 681 and 683, respectively. For consistency in FIG. 6, pivotal mounting of the stationary end of cylinders 51 and 61 to the vehicle body by bracket 685 and 687 is shown.

Steering levers 671 and 673 are coupled to piston rod 53 and piston rod 63 respectively, so that motions of piston rods 53 and 63 is produced by the operation of steering lever 671 and 673 rather than by a steering wheel as illustrated in FIG. 1. Due to the fact that steering levers 671 and 673 will typically be located on the right side and on the left side of vehicle seat 212, a linkage is provided including bell cranks 675 and 677 together with a long link 676 to constrain steering levers 671 and 673 to move together in opposite directions, which also produces similar movement for piston rods 53 and 63.

As in the case of the steering system of FIG. 1 with a steering wheel, it is desired in some cases to provide a predetermined nonlinear relationship between the motion of piston rods 53 and 63 in order that the proper relative coordinated motion of wheels 13 and 15 be achieved, including an Ackerman angle provision, if desired. This is accomplished in the apparatus illustrated in FIG. 6 by selecting an appropriate angle indicated at A between each of the bell-cranks 675 and 677 and the main arm of steering levers 671 and 673. With the angle A less than 90° as illustrated in FIG. 6, the nonlinearity of motion on pistons 53 and 63 results in greater outward turning motion for one of the wheels 13 or 15 than the inward turning motion of the other wheel. This is the usually desired arrangement for proper wheel tracking in a vehicle turn.

It will be understood that steering levers 671 and 673 will be positioned on the right and left sides seat 212 and slightly forward thereof rather than being centrally positioned in the place of steering wheel 83. This will cause cylinders 51 and 61 to be positioned at the sides of the vehicle rather than as they are shown in FIG. 2 and FIG. 3. The exact positioning of cylinders and steering levers is subject to considerable variation and they may be arranged with the levers generally vertical or in a horizontal or oblique orientation. The linkage 675, 676 and 677 of FIG. 6 is presented in schematic form only and the actual physical linkage would be designed by conventional techniques to accommodate the lever positioning and the vehicle body configuration.

A major advantage of the steering lever type system over the steering wheel type system resides in the fact that the space forward of the driver position is cleared of all obstacles related to the steering system, thereby improving crash safety of the vehicle. Another less apparent advantage of the steering lever system is that with appropriate vehicle body design and steering lever positioning, the vehicle could be entered from directly in front rather than from the side. This releases constraints on the design of the roll-over cage for the body associated with permitting side entry into and exit from the vehicle. Typically, side entry into the vehicle is difficult at best and a front entry vehicle would be substantially more accessible. These considerations are, of course, of greatest consideration in respect to a one person off-road vehicle as described and illustrated.

It should be pointed out that further variations and modifications to the steering system are possible. For example, a hybrid of the system in FIG. 1 and FIG. 6 may be employed in which the steering wheel 83 and gear box 81 of FIG. 1 are eliminated, but link 71 connecting cylinders 51 and 61 is retained; then, rather than connecting steering levers 671 and 673 to cylinders 51 and 61, two additional cylinders would be provided, making a total of six and each of these two additional cylinders would be connected in series in a respective loop of cylinders 31, 51 and cylinders 41, 61. Since all cylinders in a loop are constrained to have equal motion and link 71 would determine the linear or nonlinear relationship of motion of actuator elements or piston rods 53 and 63 and all other actuator elements coupled therewith, there would be no necessity for a linkage such as 675, 676, 677 interconnecting steering levers 671 and 673.

In addition to the variations and modifications to the invention that have been illustrated, described or suggested above, manly other variations and modifications will be apparent to those skilled in the art and accordingly, the scope of the invention is not to be deemed limited to those variations, modifications or suggestions presented, but rather the scope of the invention is to be determined by reference to the appended claims.

What is claimed is:

1. In a wheeled vehicle having a body frame and at least two independent suspension steerable wheels, with a parallel linkage forming a independent suspension for each of said steerable wheels, each said parallel linkage having a least one upper and one lower arms each with a pivot end-connection to said body frame and to the stub axle of one of said wheels, a hydraulic steering control apparatus comprising:

a first double acting two-port hydraulic cylinder having an elongated first cylinder body, a piston rod extending therefrom and attachment means for said first cylinder body, said first hydraulic cylinder being connected to and extending between a steering arm of the first of said steerable wheels and a portion of said body frame intermediate and substantially within a plane containing the pivotal end connections of said upper and lower arms, a second double acting two-port hydraulic cylinder having an elongated second cylinder body, a piston rod extending therefrom and attachment means for said second cylinder body, said second hydraulic cylinder being connected to and extending between a steering arm of the second of said steerable wheels and a portion of said body frame intermediate and substantially within a plane containing the pivotal end connections of said upper and lower arms, each of said first and second double acting two-port hydraulic cylinder being so connected that a longitudinal axis thereof is maintained substantially parallel to the arms of the corresponding parallel linkage through normal excursions of said linkage, a third, and fourth double acting two-port hydraulic cylinder each having and elongated body and a piston rod extending from one end thereof, said third and fourth cylinders bodies being coupled together, a mechanical linkage connecting the piston rods of said third and fourth cylinders to cause the motions of said piston rods to be constrained to a predetermined non-linear relationship.

a first at least one conduit for pressurized fluid including at least a portion formed of flexible hose and forming a fluid pressure transmission path from a first port of said first cylinder to a first port of said third cylinder, a second at least one conduit for pressurized fluid including at least a portion of flexible hose and forming a fluid pressure transmission path from a second port of said first cylinder to a second port of said third cylinder, a third at least one conduit for pressurized fluid including at least a portion formed of flexible hose and forming a fluid pressure transmission path from a first port of said second cylinder to a first port of said fourth cylinder, a fourth at least one conduit for pressurized fluid including at least a portion of flexible hose and forming a fluid pressure transmission path from a second port of said second cylinder to a second port of said fourth cylinder, whereby the pistons of said first and third cylinders move with a linear relation relative to one another, the pistons of said second and fourth cylinders move with a linear relation relative to one another, and the pistons of said first and second cylinders coupled to respective wheel steering arms move with a non-linear relation determined by said mechanical linkage.

2. Apparatus as recited in claim 1 wherein said third and fourth cylinders are mounted to said body frame and further including a steering wheel mounted on a shaft secured for rotational movement relative to said body frame, a reduction gear mechanism with an input and an output having said input connected to said shaft and said output connected to rotate said linkage.

3. Apparatus as recited in claim 2 further including rigid frame structure extending between and connected to said reduction gear mechanism and said third and fourth cylinders substantially preventing translational movement of said reduction gear mechanism relative to said third and fourth cylinders.

4. Apparatus as recited in claim 2 wherein said linkage comprises a centrally pivoted two arm link with a pivot pin near an end of each arm connecting said linkage to a piston rod of a respective one of said third and fourth cylinders.

5. Apparatus as recited in claim 4 wherein the effective angular spacing of said pivot pins of said arms about the central pivot of said link is between 120° and 170°.

6. Apparatus as recited in claim 1 wherein said linkage comprises a centrally pivoted two arm link with a pivot pin near the end of each arm connecting said linkage to a piston rod of a respective one of said third and fourth cylinders.

7. Apparatus as recited in claim 6 wherein the effective angular spacing of said pivot pins of said arms about the central pivot of said link is between 120° and 170°.

8. Apparatus as recited in claim 1 further including right-side and left-side steering levers mechanically coupled respectively to the piston rods of said third and fourth cylinders and wherein, said mechanical linkage is arranged to cause motions of said steering levers to be oppositely directed.

9. Apparatus as recited in claim 8 further including a bypass fluid transmission path between ports of at least one of said first, second, third, and fourth cylinders and a valve for selectively opening and closing said paths.

10. Apparatus as recited in claim 1 further including a bypass fluid transmission path between ports of at least one of said first, second, third, and fourth cylinders and a valve for selectively opening and closing said paths.

11. In a wheeled vehicle having a body frame and at least two independently suspended steerable wheels mounted on stub axles each having a vertical steering axis and a parallel linkage forming an independent suspension for each of said front wheels, each said parallel linkage having at least one upper and one lower arms each with a pivotal end-connection to said body frame and to the stub axle of one of said wheels, a hydraulic steering control apparatus comprising:

a first double acting hydraulic actuator having a first actuator body, an actuator element extending therefrom and attachment means for said first actuator body, said first double acting hydraulic actuator being connected to and extending between a steering arm of the first and said steerable wheels and a portion of said body frame intermediate and substantially within a plane containing the pivotally end connections of said upper and lower arms, a second double acting hydraulic actuator having a second actuator body, an actuator element extending therefrom and attachment means for said second actuator body, said second double acting hydraulic actuator being connected to and extending between a steering arm of the second of said steerable wheels and a portion of said body frame intermediate and substantially within a plane containing the pivotal end connections of said upper and lower arms, each of said first and second double acting hydraulic actuator being so connected that a longitudinal axis thereof is maintained substantially parallel to the arms of the corresponding parallel linkage through normal excursions of said linkage, a third and a fourth double acting two-port hydraulic actuator each having a body and an actuator element extending therefrom, said third and fourth hydraulic actuators bodies being coupled together, a mechanical linkage connecting the actuator elements of said third and fourth hydraulic actuators to cause the relative motions of said actuators elements to be constrained to a predetermined relationship, a first at least one conduit for pressurized fluid including at least a portion formed of flexible hose and forming a fluid pressure transmission path from a first port of said first hydraulic actuator to a first port of said third hydraulic actuator, a second at least one conduit for pressurized fluid including at least a portion of flexible hose and forming a fluid pressure transmission path from a second port of said first hydraulic actuator to a second port of said third hydraulic actuator, a third at least one conduit for pressurized fluid including at least a portion formed of flexible hose and forming a fluid pressure transmission path from a first port of said second hydraulic actuator to a first port of said fourth hydraulic actuator, a fourth at least one conduit for pressurized fluid including at least a portion of flexible hose and forming a fluid pressure transmission path from a second port of said second hydraulic actuator to a second port of said fourth hydraulic actuator, whereby the actuator elements of said first and third hydraulic actuators move with a linear relation relative to one another, the actuator elements of said second and fourth hydraulic actuators move with a linear relation relative to one another, and the actuator elements of said first and second hydraulic actuators coupled to respective wheel stub axles move with a relation determined at least in part by said mechanical linkage.

12. Apparatus as recited in claim 11 further including a steering wheel mounted on a shaft secured for rotational movement relative to said body frame, a reduction gear mechanism with an input and an output having said input connected to said shaft and said output connected to rotate said linkage.

13. Apparatus as recited in claim 12 wherein said linkage comprises a centrally pivoted two arm link with a pivot pin near an end of each arm connecting said linkage to an actuator element of a respective one of said third and fourth hydraulic actuators.

14. Apparatus as recited in claim 13 wherein the effective angular spacing of said pivot pins of said arms about the central pivot of said link is between 120° and 170°.

15. Apparatus as recited in claim 11 further including right-side and left-side steering levers mechanically coupled respectively to the actuator elements of said third and fourth hydraulic actuators and wherein said mechanical linkage is arranged to cause motions of said steering levers to be oppositely directed.

16. A wheeled vehicle comprising:

a body frame, at least two right-side wheels and at least two left-sides wheels, the front ones of said left-side and right-side wheels being steerable wheels, each having a stub axle and a steering arm, a parallel linkage forming an independent suspension for each of said front wheels, each said parallel linkage having at least one upper and one lower arms each with a pivotal end-connection to said body frame and to the stub axle of one of said wheels, a first fluid pressure cylinder having at least one fluid port, a first cylinder body, and actuator member extending therefrom and attachment means for said first cylinder body, said first fluid pressure cylinder being connected to and extending between a steering arm of the first of said steerable wheels and a portion of said body frame intermediate and substantially within a plane containing the pivotal end connections of said upper and lower arms, a second fluid pressure cylinder having at least one fluid port, a second cylinder body, an actuator member extending therefrom and attachment means for said second cylinder body, said second fluid pressure cylinder being connected to and extending between a steering arm of the second of said steerable wheels and a portion of said body frame intermediate and substantially within a plane containing the pivotal end connections of said upper and lower arms, each said first and second fluid pressure cylinder being so connected that a longitudinal axis thereof is maintained substantially parallel to the arms of the corresponding parallel linkage through normal excursions of said linkage, a third and a fourth fluid pressure cylinder each having a fluid port, a body, and an actuator member extending therefrom, said third and fourth cylinder bodies being coupled together to restrain relative motion therebetween, a mechanical link interconnecting said third cylinder actuator member and said fourth cylinder actuator member and causing the respective motions thereof to be constrained to a predetermined relationship, a partially flexible conduit for pressurized fluid forming a fluid pressure transmission path from a port of said second cylinder to a port of said fourth cylinder, a partially flexible conduit for pressurized fluid forming a fluid pressure transmission path from a port of said first cylinder to a port of said third cylinder, whereby the actuator members of said first and third cylinders move with a linear relation relative to one another, the actuator members of said second and fourth cylinders move with a linear relation relative to one another, and the actuator members of said first and second cylinders coupled to respective wheel steering arms move with a relation determined by said mechanical link.

17. A vehicle as recited in claim 16 further including a steering wheel mounted on a shaft secured for rotational movement relative to said body frame, a reduction gear mechanism with an input and an output having said input connected to said shaft and said output connected to rotate said link.

18. A vehicle as recited in claim 17 further including rigid frame structure extending between and connected to said reduction gear mechanism and said third and fourth fluid pressure cylinders substantially preventing translational movement of said reduction gear mechanism relative to said third and fourth fluid pressure cylinders.

19. A vehicle as recited in claim 16 further including a seat and right and left steering levers on the right-side and left-side of said seat mechanically coupled respectively to the actuator members of said third and fourth fluid pressure cylinders, and wherein said mechanical link is arranged to cause motions of said steering levers to be oppositely directed.

* * * * *